(12) United States Patent
Kim et al.

(10) Patent No.: US 7,324,262 B2
(45) Date of Patent: Jan. 29, 2008

(54) OPTICAL SHUTTER AND LIGHT SCANNING APPARATUS EMPLOYING THE SAME

(75) Inventors: Seong-jin Kim, Seongnam-si (KR); Seung-joo Shin, Seoul (KR); Il-kwon Moon, Suwon-si (KR); Kye-si Kwon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 89 days.

(21) Appl. No.: 11/115,376

(22) Filed: Apr. 27, 2005

(65) Prior Publication Data

US 2005/0243399 A1 Nov. 3, 2005

(30) Foreign Application Priority Data

Apr. 28, 2004 (KR) .................. 10-2004-0029673

(51) Int. Cl.
  *G02F 1/01* (2006.01)
(52) U.S. Cl. ........................... 359/276; 359/238
(58) Field of Classification Search ........... 359/276, 359/238, 245, 242, 259, 244, 253
  See application file for complete search history.

(56) References Cited

U.S. PATENT DOCUMENTS

| | | | |
|---|---|---|---|
| 4,763,142 | A | 8/1988 | Saitoh et al. |
| 5,287,131 | A | 2/1994 | Lee |
| 5,659,330 | A | 8/1997 | Sheridon |
| 5,923,129 | A | 7/1999 | Henry |
| 6,436,842 | B2 * | 8/2002 | Chiba et al. ............ 438/758 |
| 6,702,483 | B2 | 3/2004 | Tsuboi et al. |
| 7,079,169 | B2 * | 7/2006 | Ishikawa et al. ........ 347/233 |
| 7,180,677 | B2 * | 2/2007 | Fujii et al. ............. 359/665 |
| 2004/0196525 | A1 | 10/2004 | Fujii et al. |
| 2005/0270672 | A1 * | 12/2005 | Feenstra et al. ........ 359/845 |

FOREIGN PATENT DOCUMENTS

| | | |
|---|---|---|
| EP | 1 069 450 A2 | 1/2001 |
| EP | 1 069 450 A3 | 1/2001 |
| JP | 07-120794 | 5/1995 |
| JP | 2001-228307 | 8/2001 |
| JP | 2002-169005 | 6/2002 |
| KR | P1987-0011481 | 12/1987 |
| KR | P1193-0013822 | 7/1993 |
| WO | WO 03/005733 A1 | 1/2003 |
| WO | WO 2004/027489 A1 | 4/2004 |

* cited by examiner

*Primary Examiner*—Tim Thompson
(74) *Attorney, Agent, or Firm*—Lee & Morse, P.C.

(57) ABSTRACT

An optical shutter includes a cell having a transparent panel and a hydrophobic transparent insulation panel which are arranged to face each other, a transparent electrode formed on an outer surface of the hydrophobic transparent insulation panel, and an opaque droplet contained in the cell and contacting an inner surface of the hydrophobic transparent insulation panel, wherein the amount of light transmitted is adjusted by changing a contact angle of the opaque droplet with respect to the hydrophobic transparent insulation panel. The opaque droplet may be hydrophobic or hydrophilic. The contact angle of the opaque droplet may be changed by applying an electric field between the transparent electrode and the opaque droplet.

20 Claims, 8 Drawing Sheets

OPTICAL SHUTTER AND LIGHT SCANNING APPARATUS EMPLOYING THE SAME

BACKGROUND OF THE INVENTION

1. Field of the Invention

The present invention relates to a light scanning apparatus for an electrophotographic image forming apparatus. More particularly, the present invention relates to an optical shutter which adjusts the amount of light transmitted using an electro-wetting phenomenon and an optical scanning apparatus employing the same.

2. Description of the Related Art

In general, electrophotographic image forming apparatuses, e.g., photocopiers, laser printers, and facsimiles, produce desired images by forming a latent electrostatic image on a photosensitive medium, e.g., a photoreceptor drum or a photoreceptor belt, developing the latent electrostatic image with a developer of a predetermined color, and transferring the developed image to paper. The image forming apparatus includes a laser scanning unit (LSU) forming a latent electrostatic image corresponding to a desired image by scanning light onto a surface of the photosensitive medium.

FIG. 1 shows a configuration of a conventional light scanning apparatus for a conventional electrophotographic image forming apparatus.

Referring to FIG. 1, a conventional light scanning apparatus 10 includes a laser diode (LD) 11 as a light source for emitting a laser beam, a polygon mirror 12 scanning the laser beam emitted from the laser diode 11, a focusing lens 13 focusing the laser beam reflected by the polygon mirror 12, and a mirror 14 reflecting the laser beam passing through the focusing lens 13 to form an image at a point on a surface of a photoreceptor drum 20 that is an image forming surface.

When the light scanning apparatus 10 scans the laser beam onto the surface of the photoreceptor drum 20 that is charged to a predetermined electric potential, electric charges in an area where the laser beam is scanned are lost. Thus, a latent electrostatic image having a different electric potential from that of other areas is formed where the laser beam is scanned. Since toner supplied by a toner supply roller 30 is selectively attached to the latent electrostatic image by an electrostatic force, the latent electrostatic image is developed into a desired image. The image developed on the surface of the photoreceptor drum 20 is transferred to a print paper P and then fused on the print paper P by a fusing apparatus (not shown).

Since the conventional light scanning apparatus 10 discussed above includes an optical system having a complicated structure to scan a laser beam, the volume of the apparatus and manufacturing costs thereof are large. Also, since the conventional light scanning apparatus 10 scans the laser beam by rotating the polygon mirror 12 using a motor (not shown), there is a limit on how fast a scanning time can be realized, thus limiting increases in printing speed.

One proposed solution to these limitations includes forming a latent electrostatic image on a surface of a photoreceptor drum by adjusting transmissivity of light using a micro-shutter array using a liquid crystal instead of the conventional light scanning apparatus. However, since a polarization panel is used as the micro-shutter for the liquid crystal, the transmissivity of light decreases, thus increasing power consumption of a light source.

Another proposed solution includes an optical shutter employing reflection from air bubbles generated in a light absorbing liquid. However, since the optical shutter requires a heater to generate the air bubbles, manufacturing the optical shutter is difficult and power consumption increases.

SUMMARY OF THE INVENTION

The present invention is therefore directed to an optical shutter and light scanning apparatus employing the same, which substantially overcome one or more of the problems due to the limitations and disadvantages of the related art.

It is a feature of an embodiment of the present invention to provide an optical shutter that can adjust the amount of light transmitted using an electro-wetting phenomenon.

It is another feature of an embodiment of the present invention to provide a simplified optical shutter.

It is yet another feature of an embodiment of the present invention to provide an optical shutter with reduced power consumption.

It is still another feature of an embodiment of the present invention to provide an optical shutter with increased speed.

It is further another feature of an embodiment of the present invention to provide a light scanning apparatus employing the optical shutter.

At least one of the above and other features and advantages of the present invention may be realized by providing an optical shutter including a cell having a transparent panel and a hydrophobic transparent insulation panel which are arranged to face each other, a transparent electrode formed on an outer surface of the hydrophobic transparent insulation panel, an opaque droplet contained in the cell and contacting an inner surface of the hydrophobic transparent insulation panel, and an adjusting unit for adjusting a contact angle of the opaque droplet with respect to the hydrophobic transparent insulation panel to alter the transmissivity of the optical shutter.

The opaque droplet may be a hydrophilic droplet. The hydrophilic droplet may include a light shield material in water or in an electrolyte solution. The optical shutter may further include a transparent hydrophobic liquid that does not mix with the hydrophilic droplet filling the cell. The hydrophobic liquid may be a non-conductive organic material, e.g., silicone oil.

The opaque droplet may be a hydrophobic droplet. The hydrophobic droplet may include a light shield material in a non-conductive organic material, e.g., silicone oil. The optical shutter may further include a transparent hydrophilic liquid that does not mix with the hydrophobic droplet filling the cell. The hydrophilic liquid may be water or an electrolyte solution.

The adjusting unit may include a circuit applying an electric field between the transparent electrode and the opaque droplet.

At least one of the above and other features and advantages of the present invention may be realized by providing a light scanning apparatus including a light source, an optical shutter array having a plurality of optical shutters which adjusts an amount of light transmitted, and a microlens array having a plurality of focusing lenses which focuses the light passing through each of the optical shutters. Each of the optical shutters may be any of those noted above.

The optical shutters may be arranged in one row or may be arranged offset in two rows.

The light source may be a single point light source or a plurality of point light sources arranged at a predetermined interval. The point light source may be a laser diode or a light emitting diode. A collimating lens may be used for each point light source to convert light emitted from the point light source into a collimated beam between the point light source and the optical shutter array.

The light source may be a single linear light source, e.g., a cold cathode fluorescent lamp.

The micro-lens array may be integrally formed with the optical shutter array.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 3A and 3B illustrate enlarged views of the configuration of an example of the optical shutter of FIG. 2, in which FIG. 3A illustrates a state in which light emitted from the light source passes through the optical shutter and FIG. 3B illustrates a state in which light emitted from the light source is blocked by the optical shutter;

FIGS. 4A and 4B illustrate enlarged views of the configuration of a modified example of the optical shutter of FIG. 2, in which FIG. 4A illustrates a state in which light emitted from the light source is blocked by the optical shutter and FIG. 4B illustrates a state in which light emitted from the light source passes through the optical shutter;

DETAILED DESCRIPTION OF THE INVENTION

Figure 1:
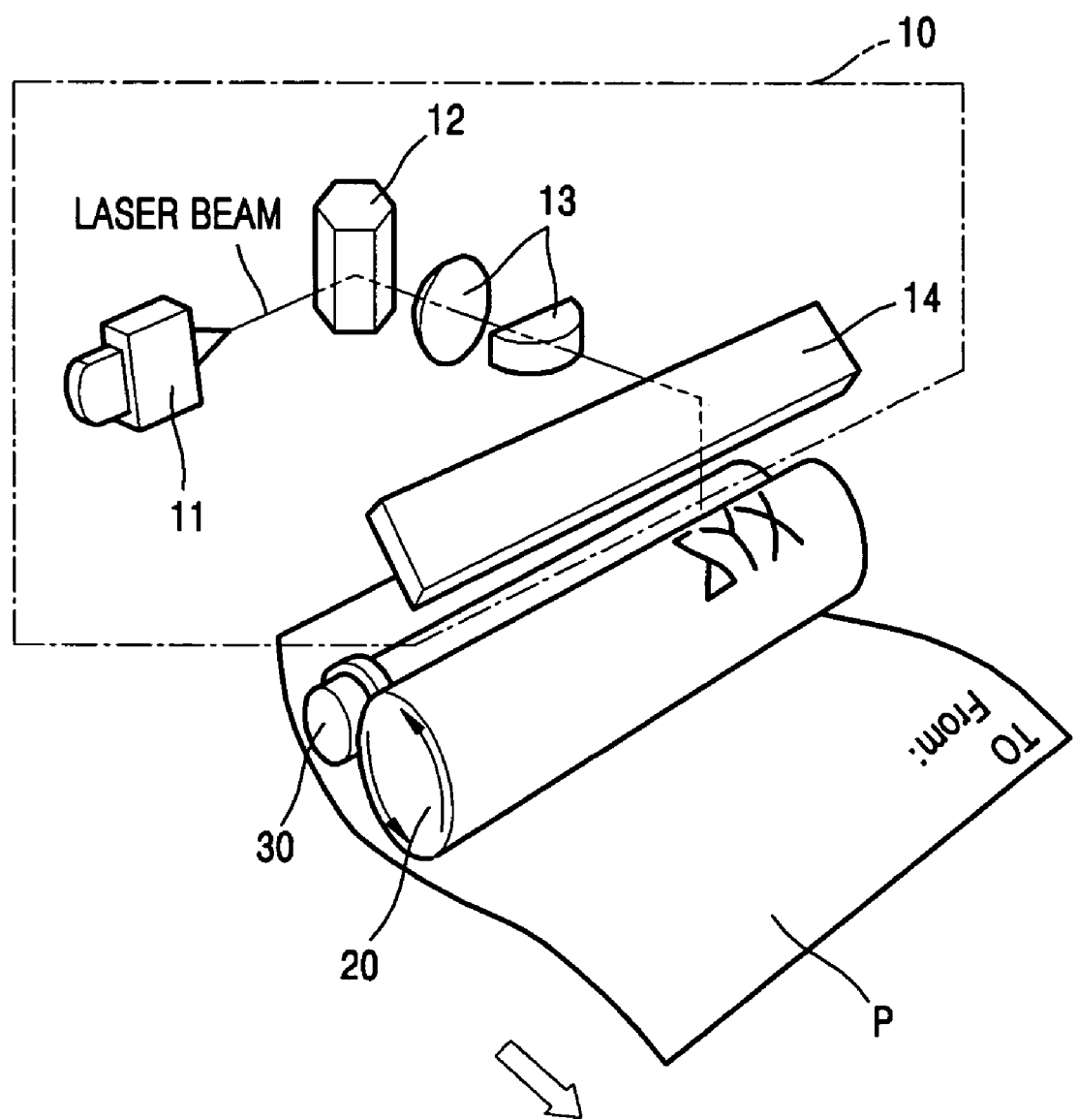
FIG. 1 illustrates a perspective view of a configuration of a conventional light scanning apparatus for an electrophotographic image forming apparatus.

Korean Patent Application No. 10-2004-0029673, filed on Apr. 28, 2004, in the Korean Intellectual Property Office, and entitled: "Optical Shutter and Light Scanning Apparatus Employing the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

Figure 2:
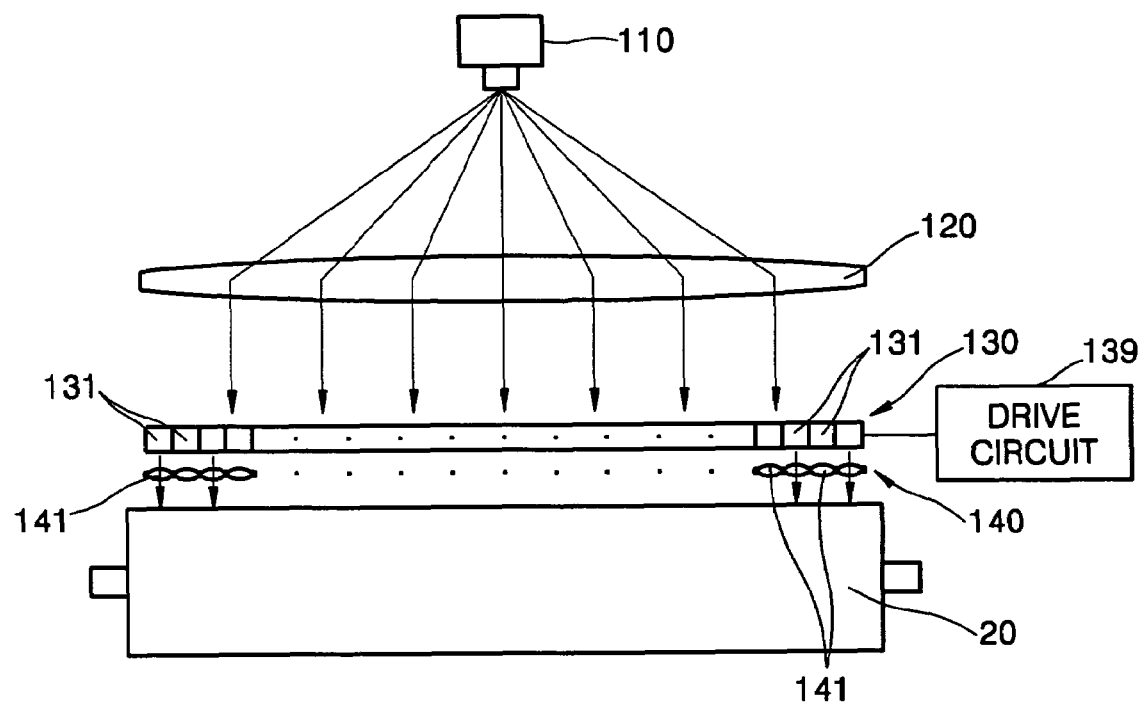
FIG. 2 illustrates a cross-sectional view of a configuration of a light scanning apparatus according to a first embodiment of the present invention.

Referring to FIG. 2, a light scanning apparatus according to a first embodiment of the present invention, which forms a latent electrostatic image by scanning light on a surface of a photoreceptor medium 20, e.g., the photoreceptor drum, of an electrophotographic image forming apparatus, e.g., a laser printer, includes a point light source 110, an optical shutter array 130 having a plurality of optical shutters 131, a drive circuit 139 and a micro-lens array 140 having a plurality of focusing lenses 141.

In the light scanning apparatus according to the first embodiment of the present invention, the point light source 110 may be a light emitting diode (LED) or a laser diode (LD). In order to have collimated light incident on the optical shutter array 130, a collimating lens 120 which converts the light emitted from the point light source 110 to collimated light is arranged between the point light source 110 and the optical shutter array 130.

The optical shutters 131 of the optical shutter array 130 adjust the amount of the light transmitted to the photoreceptor medium 20. Each of the optical shutters 131 is independently and selectively driven by the drive circuit 139 to control the amount of light transmitted through each of the optical shutters 131. The detailed structure and operation of each optical shutter will be described below.

In the optical shutter array 130, the optical shutters 131 may be arranged in a row. In this case, the number of the optical shutters 131 arranged in a row is the same as that of dots formed in one line of the surface of the photoreceptor drum 20, depending on resolution of an image.

Since the optical shutters 131 can be simultaneously driven by the drive circuit 139, a latent electrostatic image corresponding to the dots of one line can be simultaneously formed on the surface of the photoreceptor drum 20. Thus, according to the optical scanning apparatus according to the first embodiment of the present invention, since the time for scanning of a laser beam according to the conventional technology can be reduced, printing speed can be increased.

The focusing lenses 141 of the micro-lens array 140 focus the light passing through the optical shutters 131. The focusing lenses 141 are arranged to correspond to the arrangement of the optical shutters 131.

Figure 3A:
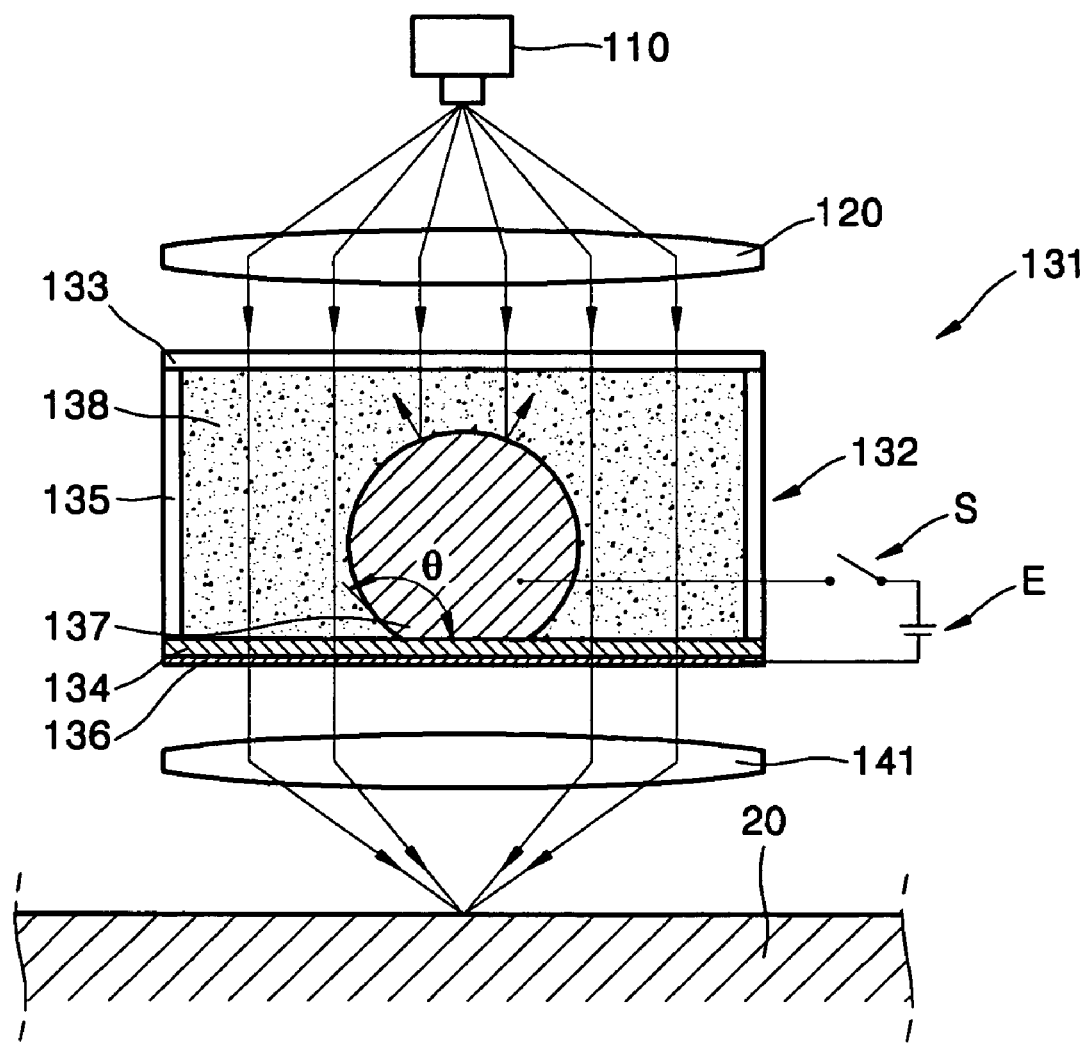
Figure 3B:
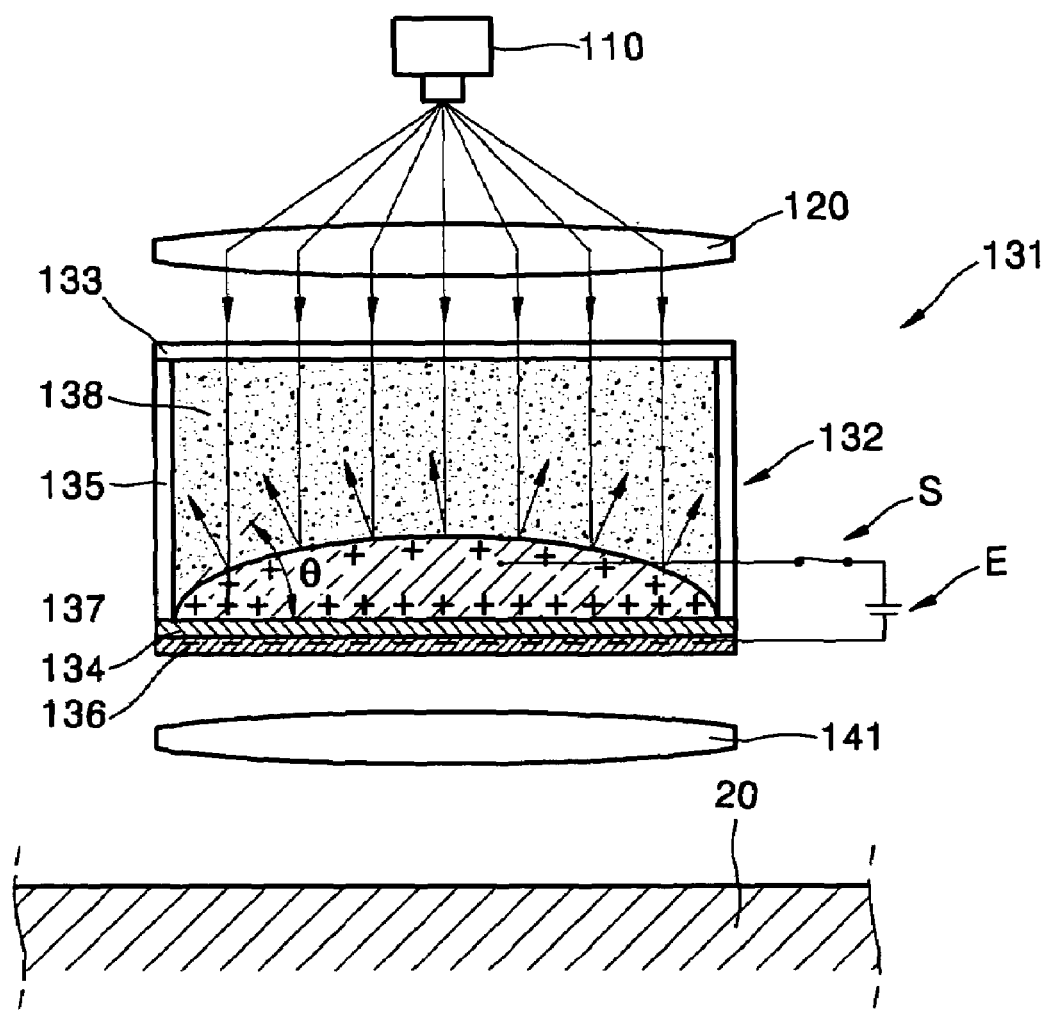

FIGS. 3A and 3B illustrate enlarged cross-sectional views of the configuration of an example of the optical shutter 131 of FIG. 2, in which FIG. 3A illustrates a state in which light emitted from the light source 110 passes through the optical shutter 131 and FIG. 3B illustrates a state in which the light emitted from the light source 110 is blocked by the optical shutter 131.

Referring to FIG. 3A, the optical shutters 131 having an identical structure may be provided in the optical shutter array 130. Each of the optical shutters 131 includes a cell 132 having an inner space which is sealed by two panels 133 and 134 arranged to face each other along an optical path and side walls 135. One of the two panels 133 and 134, e.g., the panel 133 in the present embodiment, may be formed of a transparent material, e.g., glass, so that light can pass therethrough. The other panel, e.g., the panel 134 in the present embodiment, may be formed of a hydrophobic transparent insulation material having a surface with hydrophobic and insulation properties, as well as being transmissive to light. The hydrophobic transparent insulation panel 134 may be entirely formed of a hydrophobic material that is transparent and insulating. Alternatively, the hydrophobic transparent insulation panel 134 may be formed by coating a surface of a glass panel with a hydrophobic material to a predetermined thickness. The side walls 135 separate the transparent panel 133 and the hydrophobic transparent insulation panel 134 and seal the inner space of the cell 132. The side walls 135 do not need to be transparent.

An electrode 136 is formed on an outer surface of the hydrophobic transparent insulation panel 134. The electrode 136 may be formed of a transparent electrode material, e.g., indium tin oxide (ITO), so as to be conductive and capable of transmitting light.

An opaque, i.e., non-transmissive, droplet 137 is contained in the inner space of the cell 132. In the present embodiment, the opaque droplet 137 is hydrophilic. The hydrophilic droplet 137 contacts an inner surface of the hydrophobic transparent insulation panel 134 at a predetermined contact angle θ. The contact angle θ is relatively large due to different surface properties between the hydrophobic transparent insulation panel 134 and the hydrophilic droplet 137. The hydrophilic droplet 137 may be formed of a material that is conductive. The hydrophilic droplet 137 having the above properties can be made by mixing a light shield material that absorbs or reflects light, e.g., black pigment, in water or in an electrolyte solution.

A circuit including an electric source E for applying an electric field and a switch S to connect/disconnect the electric source E is connected between the transparent electrode 136 and the hydrophilic droplet 137.

A portion of the inner space of the cell 132 which is not occupied by the hydrophilic droplet 137 can be filled with air or with a transparent hydrophobic liquid 138 that does not mix with the hydrophilic droplet 137. The hydrophobic liquid 138 can be formed of a non-conductive organic material, e.g., silicone oil.

The operation of the optical shutters 131 having the above structure will be described below.

As shown in FIG. 3A, when an electric field is not applied between the transparent electrode 136 and the hydrophilic droplet 137, the hydrophilic droplet 137 is in contact with the surface of the hydrophobic transparent insulation panel 134 at a relatively large contact angle θ and has an almost spherical shape due to surface tension. Thus, some of the light emitted from the point light source 110 and passing through the collimating lens 120 is absorbed or reflected by the opaque hydrophilic droplet 137 so as not to pass through the optical shutters 131. However, most light is transmitted to the surface of the photoreceptor medium 20 by passing through the transparent hydrophobic liquid 138. In other words, when an electric field is not applied between the transparent electrode 136 and the hydrophilic droplet 137, the transmissivity of light passing through the optical shutters 131 has a relatively high value.

The light passing through the optical shutters 131 at a high transmissivity arrives at the surface of the photoreceptor drum 20 to form a latent electrostatic image. Since the light passing through the optical shutters 131 is focused by the focusing lens 141, the diameter of a light spot formed on the surface of the photoreceptor drum 20 decreases and, accordingly, resolution of an image can be improved.

Referring to FIG. 3B, when an electric field is applied between the transparent electrode 136 and the hydrophilic droplet 137, the contact angle θ of the hydrophilic droplet 137 with respect to the hydrophobic transparent insulation panel 134 decreases due to an electro-wetting phenomenon. Accordingly, the hydrophilic droplet 137 contacts a large area of the surface of the hydrophobic transparent insulation panel 134. In detail, when an electric field is applied between the transparent electrode 136 and the hydrophilic droplet 137, negative charges are accumulated on the transparent electrode 136 and positive charges are accumulated on the hydrophilic droplet 137 with the hydrophobic transparent insulation panel 134 interposed therebetween. Thus, a width of the hydrophilic droplet 137 increases due to an electrostatic force between the negative charges and the positive charges.

When the hydrophilic droplet 137 has an increased width, all or most of the light emitted from the point light source 110 and passing through the collimating lens 120 is absorbed or reflected by the opaque hydrophilic droplet 137, and thus does not pass through the optical shutters 131.

In the optical shutters 131 according to the present invention, the contact angle θ of the hydrophilic droplet 137 with respect to the hydrophobic transparent insulation panel 134 changes according to the application of an electric field between the transparent electrode 136 and the hydrophilic droplet 137. As a result, the amount of light transmitted can be adjusted.

In the light scanning apparatus according to the first embodiment of the present invention, since the optical shutter array 130 having the optical shutters 131 is provided, the structure of the light scanning apparatus is simplified compared to the conventional light scanning apparatus having a polygon mirror, a motor that rotates the polygon mirror, and a plurality of lenses and mirrors for laser scanning. Also, since the optical shutters 131 according to the first embodiment of the present invention do not use a polarization panel as employed when using liquid crystals, the transmissivity of light increases, so that power consumption of the point light source 110 decreases.

Figure 4A:
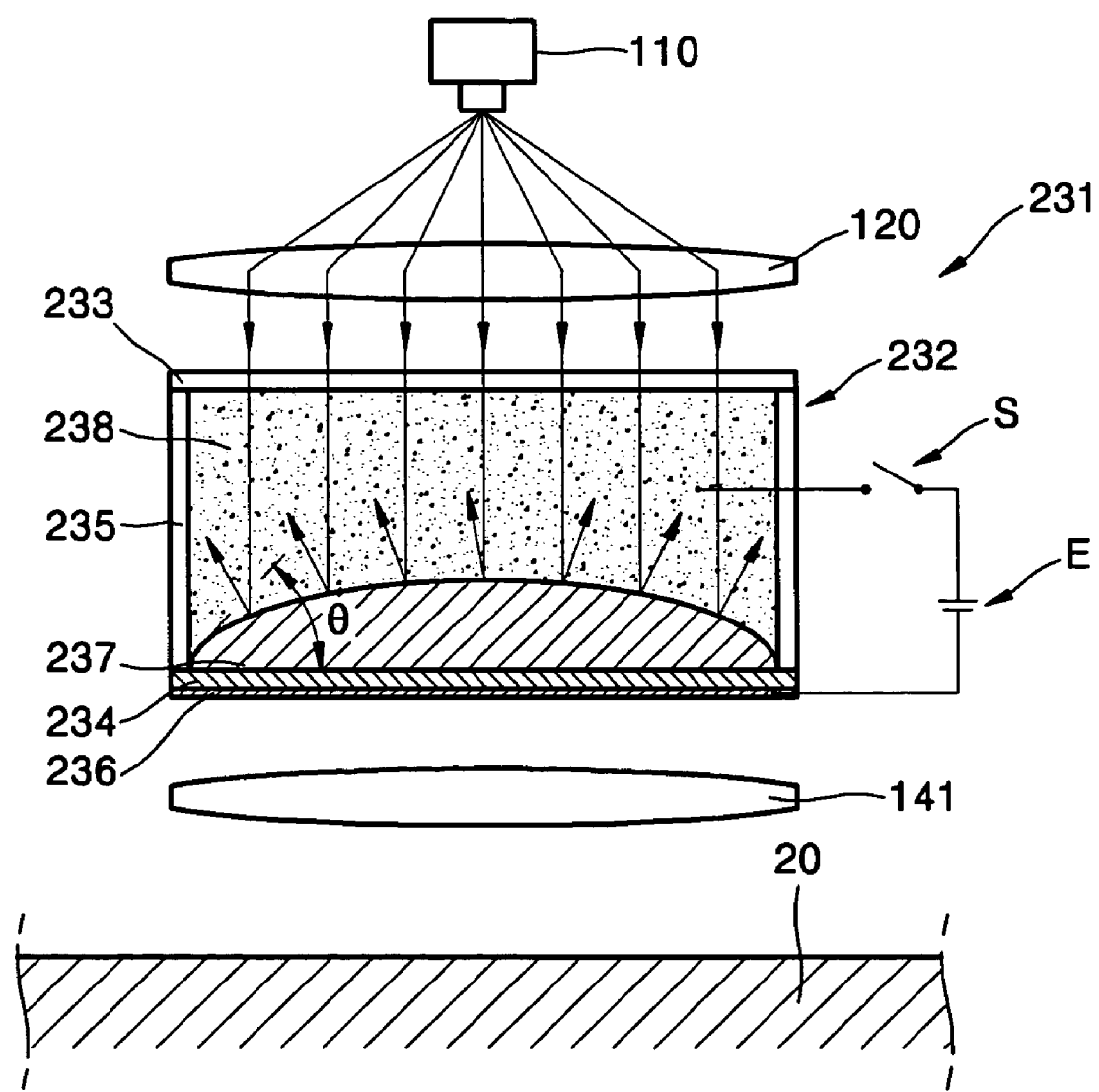
Figure 4B:
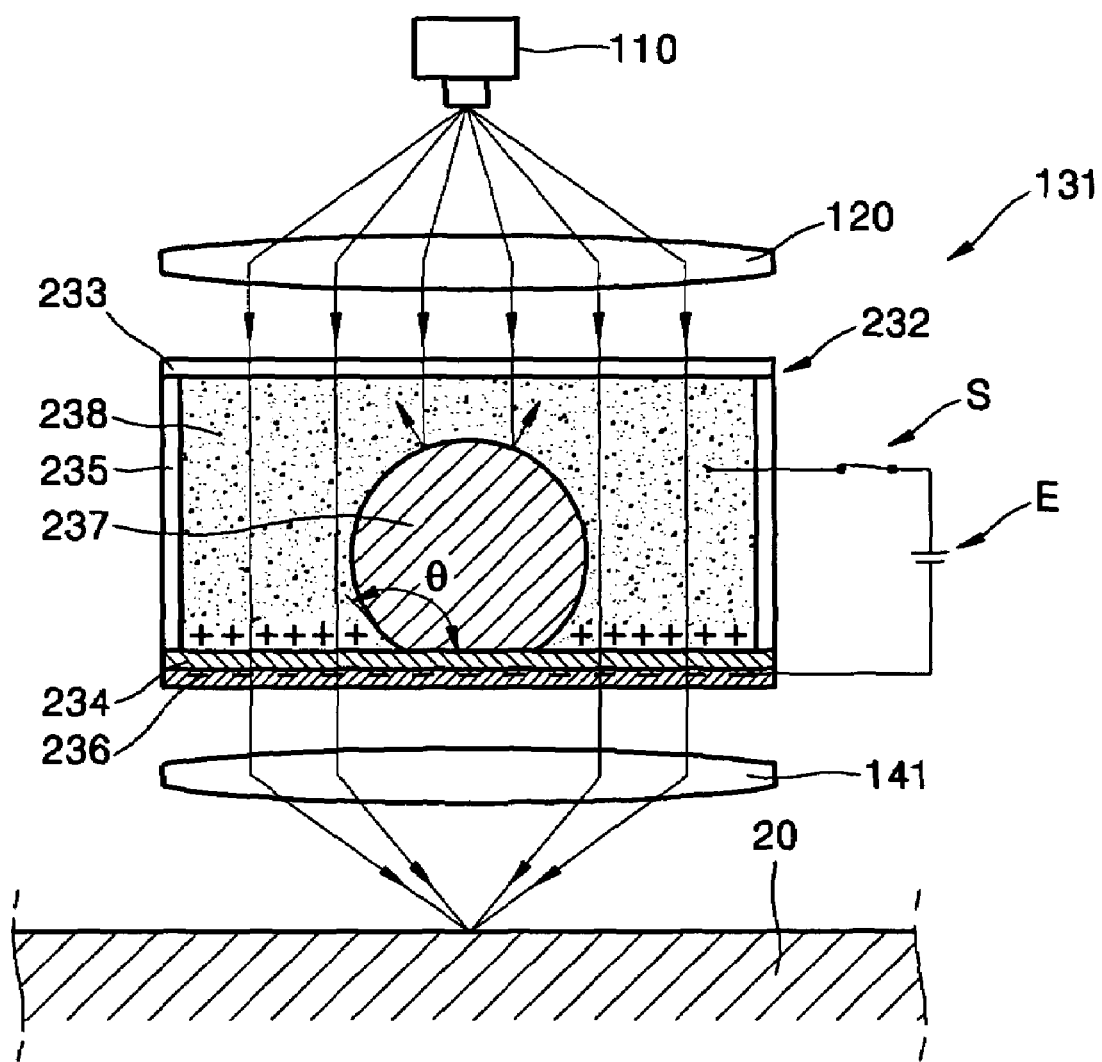

FIGS. 4A and 4B illustrate enlarged views of a configuration of a modified optical shutter 231 of FIG. 2, in which FIG. 4A illustrates a state in which light emitted from the light source 110 is blocked by the optical shutter 231 and FIG. 4B illustrates a state in which light emitted from the light source 110 passes through the optical shutter 231.

Referring to FIG. 4A, the optical shutter 231 according to a modified example of the first embodiment of the present invention includes a cell 232 having an inner space sealed by a transparent panel 233 and a hydrophobic transparent insulation panel 234, which are arranged to face each other, and side walls 235. A transparent electrode 236 is formed on an outer surface of the hydrophobic transparent insulation panel 234. Since the structures of the transparent panel 233, the hydrophobic transparent insulation panel 234, the side walls 235, and the transparent electrode 236 are the same as those of the optical shutters 131 shown in FIG. 3A, detailed descriptions thereof will be omitted herein.

An opaque droplet 237 that is hydrophobic and a liquid 238 that is hydrophilic are contained in the inner space of the cell 232. The hydrophobic droplet 237 contacts an inner surface of the hydrophobic transparent insulation panel 234 at a predetermined contact angle θ. Here, the contact angle θ is a relatively small value because the hydrophobic transparent insulation panel 234 and the hydrophobic droplet 237 have the same surface property. Thus, the hydrophobic droplet 237 contacts a large area of the surface of the hydrophobic transparent insulation panel 234. The hydrophobic droplet 237 may be formed of a material that is non-conductive. The hydrophobic droplet 237 having the above properties can be formed by mixing a light shield material, e.g., black pigment, in a non-conductive organic material, e.g., silicone oil.

The hydrophilic liquid 238 may be formed of a material that is conductive, transparent and does not mix with the hydrophobic droplet 237. The hydrophilic liquid 238 having the above properties can be made of water or an electrolyte solution. The circuit including the electric source E and the switch S is connected between the transparent electrode 236 and the hydrophilic liquid 238.

The operation of the optical shutter 231 having the above structure will be described below.

As shown in FIG. 4A, when an electric field is not applied between the transparent electrode 236 and the hydrophilic liquid 238, the hydrophobic droplet 237 having the same surface property as that of the hydrophobic transparent insulation panel 234 is in contact with the surface of the hydrophobic transparent insulation panel 234 in a widely spread state. Accordingly, all or most of the light emitted from the point light source 110 and passing through the collimating lens 120 is absorbed or reflected by the opaque hydrophobic droplet 237, thus does not pass through the optical shutter 231.

Referring to FIG. 4B, when an electric field is applied to the transparent electrode 236 and the hydrophilic liquid 238 by connecting the electric source E thereto, a contact area between the hydrophilic liquid 238 and the hydrophobic transparent insulation panel 234 increases by an electro-wetting phenomenon. Accordingly, a contact area between the hydrophobic droplet 237 and the hydrophobic transparent insulation panel 234 decreases, so that the contact angle θ of the hydrophobic droplet 237 with respect to the hydrophobic transparent insulation panel 234 increases. In detail, when an electric field is applied between the transparent electrode 236 and the hydrophilic liquid 238, negative charges are accumulated on the transparent electrode 236 and positive charges are accumulated on the hydrophilic liquid 238 with the hydrophobic transparent insulation panel 234 interposed therebetween. The hydrophilic liquid 238 pushes the hydrophilic droplet 237 and moves toward the hydrophobic transparent insulation panel 234 by an electrostatic force between the negative charges and the positive charges. Thus, while the contact area between the hydrophilic liquid 238 and the hydrophobic transparent insulation panel 234 increases, the contact area between the hydrophobic droplet 237 and the hydrophobic transparent insulation panel 234 decreases.

Therefore, most of the light emitted from the point light source 110 and passing through the collimating lens 120 passes through the transparent hydrophilic liquid 238 to the surface of the photoreceptor drum 20. That is, when an electric field is applied to the transparent electrode 236 and the hydrophilic liquid 238, the transmissivity of light passing through the optical shutter 231 has a relatively high value. Again, light passing through the optical shutter 231 is focused by the focusing lens 141 to form a light spot having a relatively small diameter on the surface of the photoreceptor drum 20.

In the above-described modified example of the optical shutter 231, the contact angle of the hydrophobic droplet 237 with respect to the hydrophobic transparent insulation panel 234 changes depending on the application of the electric field between the transparent electrode 236 and the hydrophilic liquid 238. Accordingly, the amount of light transmitted is adjusted.

Figure 5:
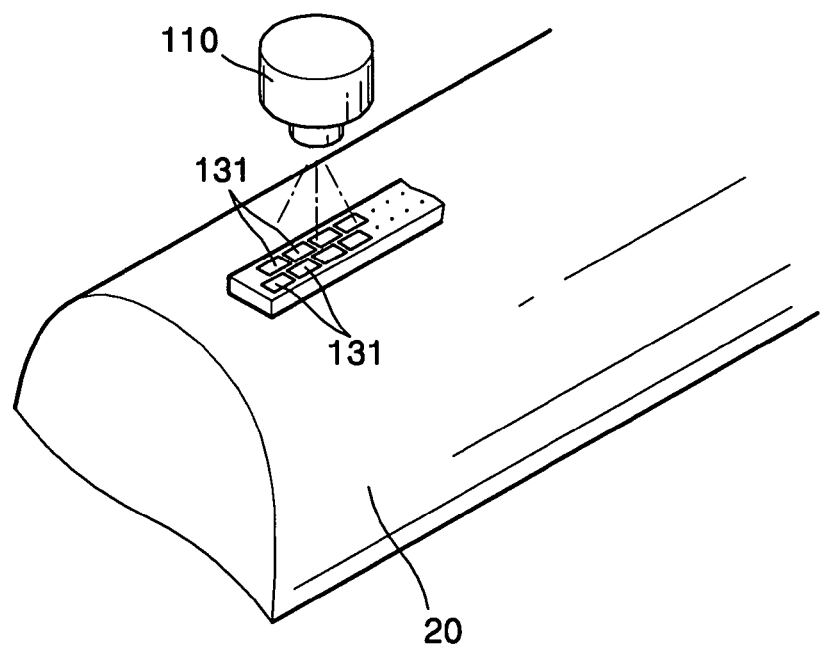
FIG. 5 illustrates a perspective view of another arrangement of a plurality of optical shutters in the optical shutter array shown in FIG. 2.

FIG. 5 illustrates a perspective view of another arrangement of a plurality of optical shutters in the optical shutter array shown in FIG. 2. Referring to FIG. 5, in the optical shutter array 130, the optical shutters 131 may be arranged offset from one another in two rows, i.e., in a zigzag pattern. The number of the optical shutters arranged in two rows is the same as the number of dots formed in one line on the surface of the photoreceptor drum 20. Such an arrangement may be used when all the optical shutters 131 cannot be arranged in one row, e.g., because the size of each of the optical shutters 131 is large.

Figure 6:
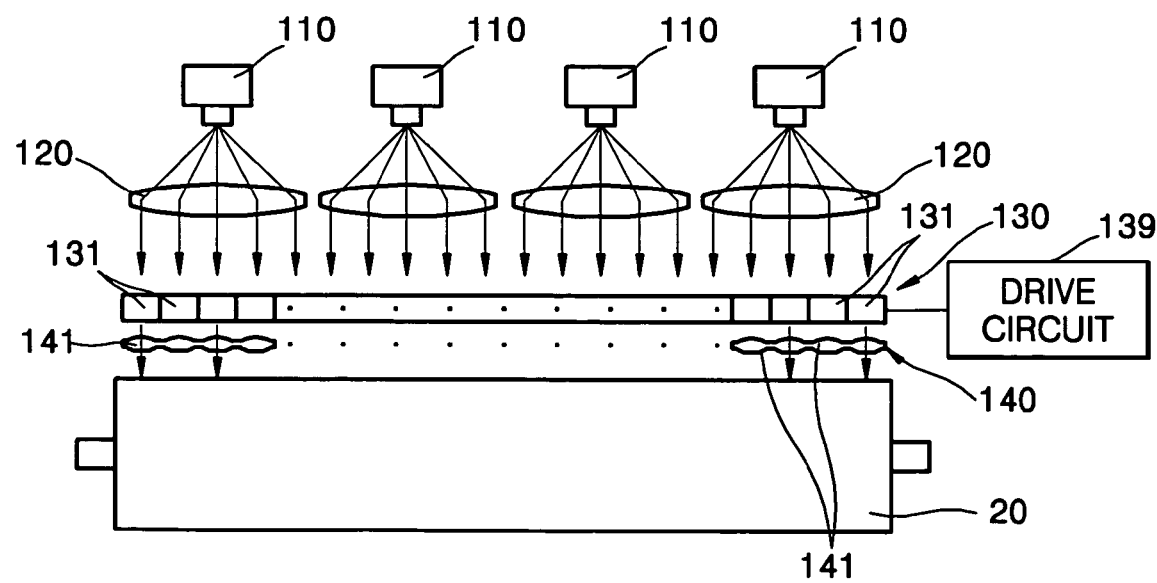
FIG. 6 illustrates a cross-sectional view of a configuration of a light scanning apparatus according to a second embodiment of the present invention.

FIG. 6 illustrates a cross-sectional view of a configuration of a light scanning apparatus according to a second embodiment of the present invention. Referring to FIG. 6, the light scanning apparatus according to the second embodiment of the present invention includes a plurality of point light sources 110, e.g., LDs or LEDs, arranged with a predetermined interval. A plurality of collimating lenses 120, each of which converts light emitted from a corresponding point light source 110 into a collimated beam, are arranged between the point light sources 110 and the optical shutter array 130.

When the point light sources 110 are used, the spacing between the point light sources 110 and the optical shutter array 130 can be further reduced compared to the first embodiment, in which only one point light source is used. Thus, a more compact light scanning apparatus can be realized. Here, other constituent elements of the light scanning apparatus according to the second embodiment are the same as those of the light scanning apparatus according to the first embodiment of the present invention.

Figure 7:
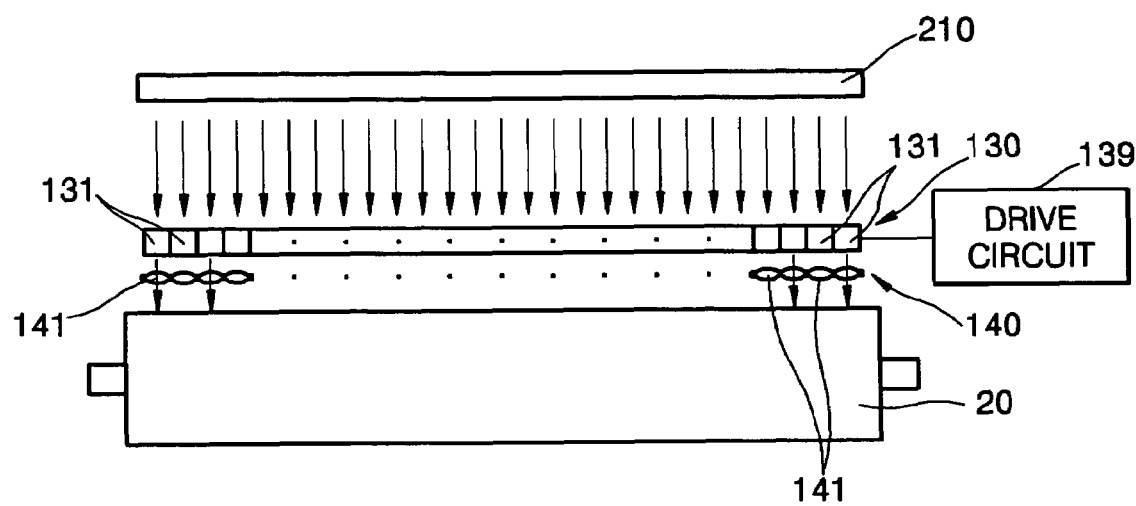
FIG. 7 illustrates a cross-sectional view of a configuration of a light scanning apparatus according to a third embodiment of the present invention.

FIG. 7 illustrates a cross-sectional view of the configuration of a light scanning apparatus according to a third embodiment of the present invention. Referring to FIG. 7, the light scanning apparatus according to the third embodiment of the present invention includes a linear light source 210, e.g., a cold cathode fluorescent lamp (CCFL).

When the linear light source 210 is used, a parallel beam can be incident on the optical shutter array 130 even without the collimating lens 120 used in FIGS. 2 and 6. Thus, a light scanning apparatus can be made more compact than in a case where the point light source 110 is used. Here, other constituent elements of the light scanning apparatus according to the third embodiment are the same as those of the light scanning apparatuses according to the first and second embodiments of the present invention.

Figure 8:
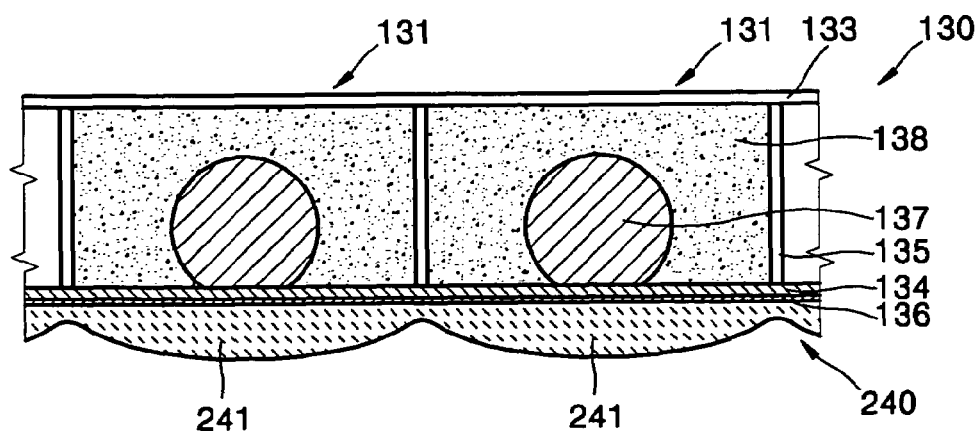
FIG. 8 illustrates a cross-sectional view of a configuration of a modified example of a micro-lens array of the light scanning apparatus according to an embodiment of the present invention.

FIG. 8 illustrates a cross-sectional view of a configuration of a modified example of a micro-lens array of the light scanning apparatus according to an embodiment of the present invention. Referring to FIG. 8, a micro-lens array 240 having a plurality of focusing lenses 241 for focusing light which passes through each of the optical shutters 131 or 231 can be integrally formed with the optical shutter array 130. When the micro-lens array 240 is integrally formed with the optical shutter array 130, manufacturing and handling of the micro-lens array 240 is made easy so that the size and manufacturing costs of the optical scanning apparatus can be lowered.

As described above, since the light scanning apparatus according to the present invention includes an optical shutter which adjusts the amount of light transmitted using the electro-wetting phenomenon, the structure thereof is simplified. Thus, a compact light scanning apparatus can be realized with reduced manufacturing costs.

Also, since the conventional scanning time of a laser beam can be reduced, printing speed can be increased. Furthermore, since the optical shutter according to the present invention does not need a polarization panel unlike the convention optical shutter using liquid crystal, the transmissivity of light is improved so that power consumption of the light source is lowered.

Exemplary embodiments of the present invention have been disclosed herein, and although specific terms are employed, they are used and are to be interpreted in a generic and descriptive sense only and not for purpose of limitation. For example, while only an on/off switch is illustrated herein, a variable switch to control the strength of the applied electric field may be used to further vary the transmissivity. Accordingly, it will be understood by those of ordinary skill in the art that various changes in form and details may be made without departing from the spirit and scope of the present invention as set forth in the following claims.

What is claimed is:

1. An optical shutter, comprising:
a cell having a transparent panel and a hydrophobic transparent insulation panel which are arranged to face each other along an optical path;
a transparent electrode on an outer surface of the hydrophobic transparent insulation panel;
an opaque droplet contained in the cell and contacting an inner surface of the hydrophobic transparent insulation panel along the optical path, the opaque droplet being a hydrophilic droplet;
a transparent hydrophobic liquid that does not mix with the hydrophilic droplet filling the cell together with the hydrophilic droplet; and
a means for adjusting a contact angle of the opaque droplet with respect to the hydrophobic transparent insulation panel to alter the transmissivity of the optical shutter;
wherein the opaque droplet has a substantially spherical shape when the optical shutter is transmitting light.

2. The optical shutter as claimed in claim 1, wherein the hydrophilic droplet includes a light shield material in water or in an electrolyte solution.

3. The optical shutter as claimed in claim 1, wherein the hydrophobic liquid is a non-conductive organic material.

4. The optical shutter as claimed in claim 3, wherein the organic material is silicone oil.

5. An optical shutter, comprising:
a cell having a transparent panel and a hydrophobic transparent insulation panel which are arranged to face each other along an optical path;
a transparent electrode on an outer surface of the hydrophobic transparent insulation panel;
an opaque droplet contained in the cell and contacting an inner surface of the hydrophobic transparent insulation panel along the optical path; and
a means for adjusting a contact angle of the opaque droplet with respect to the hydrophobic transparent insulation panel to alter the transmissivity of the optical shutter;
wherein the opaque droplet has a substantially spherical shape when the optical shutter is transmitting light, and
wherein the opaque droplet is a hydrophobic droplet.

6. The optical shutter as claimed in claim 5, wherein the hydrophobic droplet includes a light shield material in a non-conductive organic material.

7. The optical shutter as claimed in claim 6, wherein the non-conductive organic material is silicone oil.

8. The optical shutter as claimed in claim 5, further comprising a transparent hydrophilic liquid that does not mix with the hydrophobic droplet filling the cell together with the hydrophobic droplet.

9. The optical shutter as claimed in claim 8, wherein the hydrophilic liquid is water or an electrolyte solution.

10. The optical shutter as claimed in claim 1, wherein the means for adjusting includes a means for applying an electric field between the transparent electrode and the opaque droplet.

11. A light scanning apparatus, comprising:
a light source;
an optical shutter array having a plurality of optical shutters which adjusts an amount of light transmitted; and
a micro-lens array having a plurality of focusing lenses which focuses the light passing through each of the optical shutters, wherein each of the optical shutters includes:
a cell having a transparent panel and a hydrophobic transparent insulation panel which are arranged to face each other;
a transparent electrode formed on an outer surface of the hydrophobic transparent insulation panel;
an opaque droplet contained in the cell and contacting an inner surface of the hydrophobic transparent insulation panel; and
means for adjusting a contact angle of the opaque droplet with respect to the hydrophobic transparent insulation panel to alter the transmissivity of the optical shutter,
wherein the opaque droplet is a hydrophobic droplet.

12. The apparatus as claimed in claim 11, wherein the means for adjusting includes a means for applying an electric field between the transparent electrode and the opaque droplet.

13. A light scanning apparatus, comprising:
a light source;
an optical shutter array having a plurality of optical shutters which adjusts an amount of light transmitted; and
a micro-lens array having a plurality of focusing lenses which focuses the light passing through each of the optical shutters,
wherein the optical shutters are arranged offset in two rows.

14. The apparatus as claimed in claim 13, wherein the light source is a single point light source.

15. The apparatus as claimed in claim 14, further comprising a collimating lens which converts light emitted from the point light source into a collimated beam between the point light source and the optical shutter array.

16. The apparatus as claimed in claim 13, wherein the light source includes a plurality of point light sources arranged at a predetermined interval.

17. The apparatus as claimed in claim 16, further comprising a plurality of collimating lenses which converts light emitted from the point light sources to a collimated beam between the point light sources and the optical shutter array.

18. The apparatus as claimed in claim 13, wherein the light source is a single linear light source.

19. The apparatus as claimed in claim 18, wherein the linear light source is a cold cathode fluorescent lamp.

20. The apparatus as claimed in claim 13, wherein the micro-lens array is integrally formed with the optical shutter array.

* * * * *